UNITED STATES PATENT OFFICE.

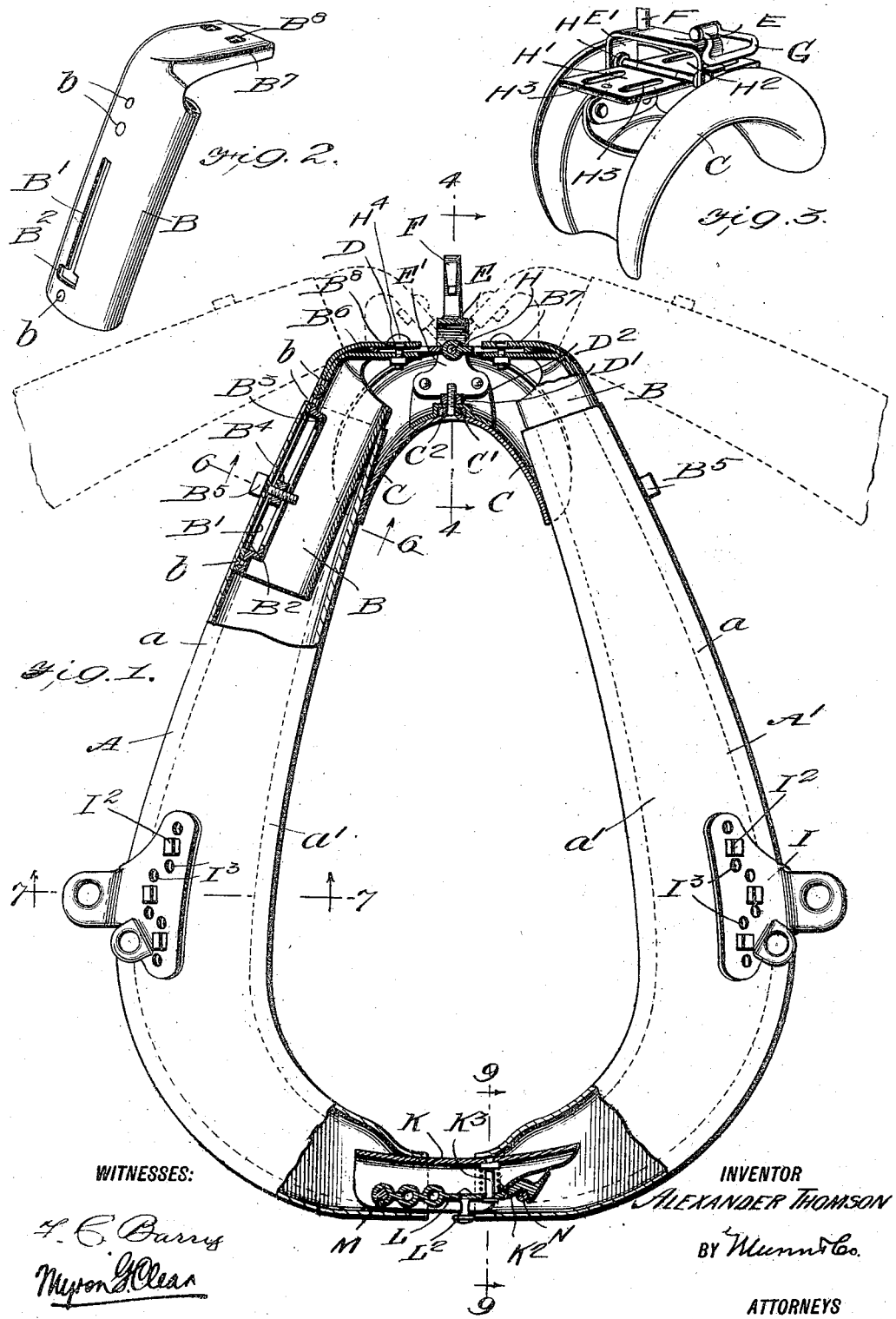
A. THOMSON.
HORSE COLLAR.
APPLICATION FILED JAN. 18, 1916.
1,241,305.
Patented Sept. 25, 1917.
2 SHEETS—SHEET 1.

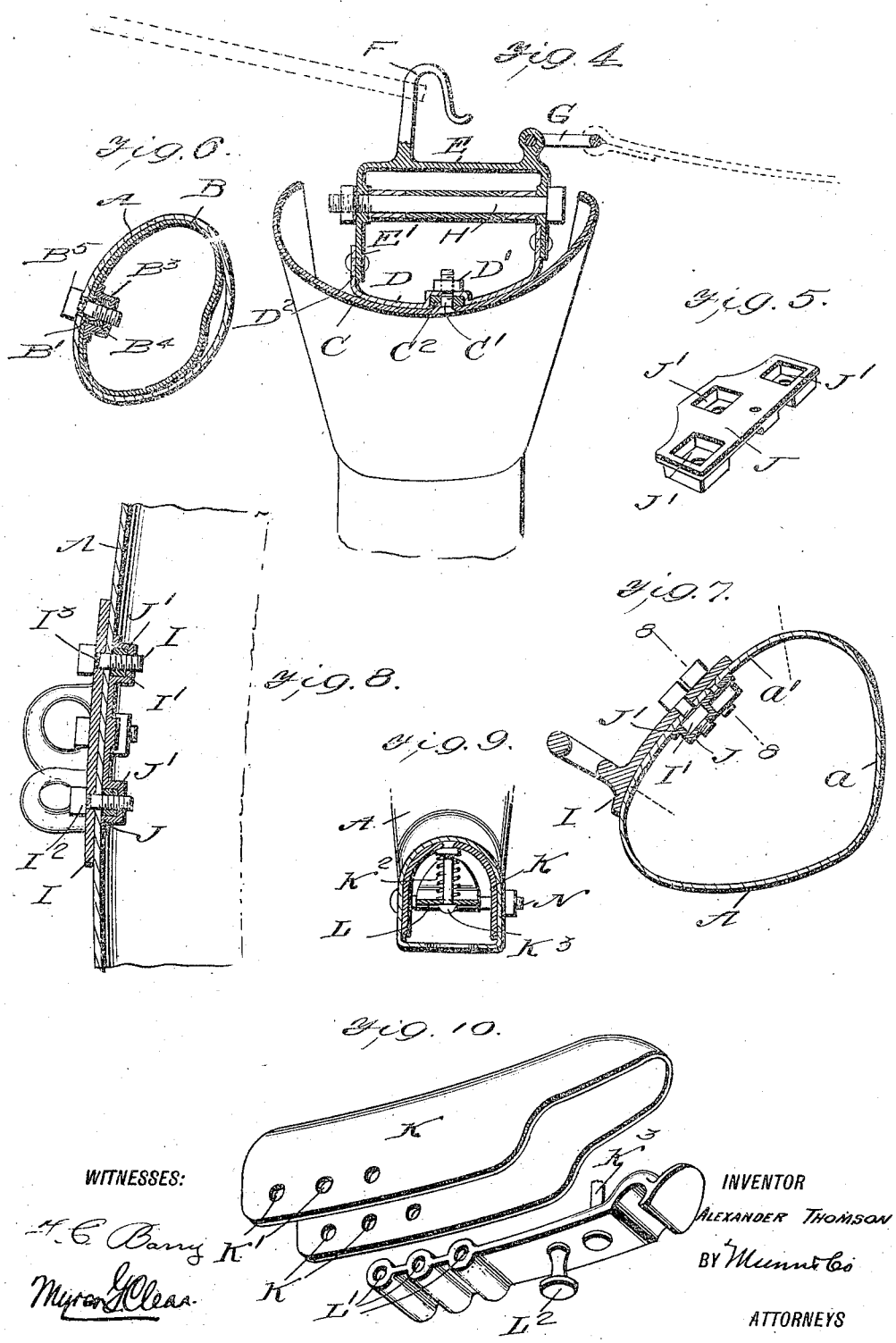

ALEXANDER THOMSON, OF FITCHBURG, MASSACHUSETTS.

HORSE-COLLAR.

1,241,305.  Specification of Letters Patent.  Patented Sept. 25, 1917.

Application filed January 18, 1916. Serial No. 72,713.

*To all whom it may concern:*

Be it known that I, ALEXANDER THOMSON, a citizen of the United States, and a resident of Fitchburg, in the county of Worcester and State of Massachusetts, have invented a certain new and useful Improvement in Horse-Collars, of which the following is a specification.

My present invention relates generally to horse collars, and more particularly to those of wholly metallic construction, my primary object being to provide a construction capable of more ready maintenance in cleanly, sanitary condition, and providing for better and more effective shaping of the collar as a whole, as well as for a wider range of adjustment which, with the betterment as to shape, results in better fitting of the collar to the neck of a particular horse.

Further objects residing for the most part in the specific details of the several parts of my improved collar, together with the advantages resulting therefrom, and from their combination, will be apparent from the following description and reference to the accompanying drawings, forming a part of this specification, and wherein:

Figure 1 is an elevation, partly broken away and in section, of my improved collar.

Fig. 2 is a detail perspective view of one of the telescoping side extensions removed.

Fig. 3 is a similar view of the pad and the parts carried thereby.

Fig. 4 is a vertical section taken on line 4—4 of Fig. 1.

Fig. 5 is a detail perspective view of the nut holder for the trace fastener.

Fig. 6 is a detail cross section taken on line 6—6 of Fig. 1.

Fig. 7 is a similar view taken on line 7—7 of Fig. 1.

Fig. 8 is a detail section taken on line 8—8 of Fig. 7.

Fig. 9 is a similar view taken on line 9—9 of Fig. 1, and

Fig. 10 is a detail perspective view of certain parts of the detachable buckle at the lower end of the collar.

Referring now to these figures, and particularly to Fig. 1, I provide a collar the sides A and A' of which are constructed of sheet metal and are tubular in form throughout, as shown, providing for a better shaping of the collar sides than is possible at present with the sides U-shaped in cross section as now formed, and further providing for better and more convenient reception of tubular extension pieces B, one located at the upper end of each of the collar sides and telescoped therein, each of these extension pieces, one of which is shown in detail in Fig. 2, being provided with a longitudinal slot $B'$ having an enlarged opening $B^2$ at the inner end thereof, and each having upon its inner face, and secured thereto by rivets $b$ or like fastening members, a nut holder $B^3$ in the form of a slotted nut race, in which a nut $B^4$ is movable the full length of the slot $B'$ and its opening $B^2$, being movable into and out of the holder $B^3$ through the said opening $B^2$, by canting the nut to angular position through the said opening which is of less width than the width of the nut and thus prevent the nut from accidentally falling through when the extension B is initially placed into the end of the respective collar side.

It is therefore essential only that the collar side be provided with a single opening through which the bolt $B^5$ is projectable into engagement with the nut $B^4$, to clamp the respective collar side and its extension B in adjusted position in accordance with the desired length of the complete collar. Then by loosening bolt $B^5$, the length of the collar may be adjusted at any time by virtue of slot $B'$ of the extension B.

In order that each of the collar sides may be pressed to proper collar form to fit horses in general, it is necessary in the interests of economy and effectiveness to first shape parts of each side and then weld the parts together, and I preferably do this by utilizing two pieces $a$ and $a'$ as shown in Figs. 1 and 7, pressing these two sheet metal parts to shape and welding the same together along the broken lines in said figures.

In further accord with my invention, the pad C which laps the upper ends of the collar sides A and A' upon the inside thereof, as usual, is provided with a substantially central upstanding bolt $C'$, the lower head of which is, as shown in Fig. 1, countersunk into the under surface of the pad, the bolt being held rigid by a nut $C^2$ threaded thereon and bearing upon the upper surface of the pad.

Secured upon the upper surface of the pad C, by means of a nut $D'$ engaging bolts $C'$, is a supporting plate D, through which the said bolt passes, having a lower counterbore seated over the bolt holding nut $C^2$, the lower portion of this supporting plate being curved to fit the curvature of the pad, and the ends being provided with upstanding flanges D² to which are riveted or otherwise securely fastened the downturned end portions E' of a bracket E, the body of which upstands above the pad and supports the usual check rein and back strap hooks F and G respectively.

The bracket E also supports a transverse bolt H forming the pintle of a hinge, and to this end receiving thereon the inner portions of the two outstanding hinged leaves H' and H² as clearly seen in Figs. 1, 3, and 4, each of these leaves having slotted openings H³ and being adapted for reception in a pocket B⁶ formed at the upper angular end B⁷ of the respective side extension B, which upper end is provided with bolt openings B⁸ receiving adjusting bolts H⁴ which serve to rigidly connect the side extension B in adjustable relation to the respective leaf of the hinge, which thus permits the two sides of the collar to be moved away from one another as indicated in dotted lines in Fig. 1, when disposing the collar upon, and removing the same from, a horse's neck.

It is to be noted particularly at this point that the connection shown and described not only permits of adjustable lengthening of the collar itself, but also permits the width of its upper end to be varied, and a much better, more comfortable, and otherwise improved fit upon a particular horse may be had.

I provide for the ready securing of attachments such as trace fasteners I, as seen in Fig. 1, by riveting to the inner surface of the tubular sides A and A', nut holders, one of which is shown in detail in Fig. 5, each nut holder J having a plurality of nut cups J' in which the nuts I' are disposed, the holder J being riveted or otherwise secured to the inner surfaces of the collar sides in proper alinement with openings through the same. Thus, the securing bolt I² extended through selected openings I³ of the trace fasteners, may be engaged with the nuts without trouble, and the trace fasteners or other attachments thus securely held in adjusted position, all as clearly seen by reference to Figs. 1, 5, 7, and 8.

At the lower end of the collar is a connection between the lower ends of the sides A and A', the shield K and latch L of which are provided with series of bolt-receiving openings K' and L' respectively, for the reception of the bolt M engageable through any one of the openings and thus necessitating but a single bolt opening through the lower end of the side A of the collar. The latch L has a thumb piece L² and is acted upon by a spring K² coiled about a guide pin K³ projecting from the shield K and upon which the latch is guided in its movements to and from engagement with the latch pin N extending transversely through the lower end of the collar side A'.

Thus by means of the particular construction adjacent the lower end of the collar just described, and in addition to the detachable fastening of the collar sides, their lower ends may be adjusted toward and away from one another to vary the width of the lower portion of the collar, with but a single bolt opening through the collar side instead of a plurality of such openings as usually used for this purpose.

Thus, the collar as a whole is strengthened and rendered more effective and durable in use, as well as providing for more ready maintenance in cleanly sanitary condition, beyond the advantages accruing from the greater range of adjustment thereof as above outlined.

I claim:—

1. A metallic horse collar comprising tubular sides having side apertures, and harness fastenings adjacent said apertures, nut holders secured within said tubular sides and having nut holding recesses below said apertures, and fastening bolts extending through said harness fastenings and said apertures, and engaging the nuts carried by said nut holders.

2. A metallic horse collar having hollow tubular sheet metal sides open at their upper ends and adjustably connected at their lower ends, extension members adjustably telescoped within the upper ends of said sides, connections between said extension members, and means for securing said members in adjusted position, including bolts extending through portions of said sides, and nuts adjustably carried by said extension members within the sides and engaged by said bolts.

3. A metallic horse collar having tubular sides adjustably connected at their lower ends, extension members adjustably telescoped within the upper ends of said sides and provided with upper inturned portions, means for securing said members in adjusted position, and adjustable connections between the said extension members including a pad bridging the upper ends of the collar sides, and a hinge above the pad and upon which the sides are movable relatively to one another having its hinge plates adjustably secured to said inturned portions of said extensions.

4. A metallic horse collar having tubular sheet metal sides adjustably connected at their upper and lower ends, and a tubular extension telescoped within the upper end of each of said sides and having an upper inturned annular portion provided with a pocket.

5. A metallic horse collar having tubular sheet metal sides adjustably connected at their upper and lower ends, and a tubular extension telescoped within the upper end of each of said sides and adjustably connected thereto, said extension having a longitudinal slot and an opening at the end of said slot, and a nut holder secured within the extension in alinement with the slot thereof, a nut slidably disposed within said holder and movable lengthwise of the slot, and a bolt extending through the respective collar side and engaging the nut in adjusted position through the slot of the extension.

6. A metallic horse collar having side portions adjustably and detachably connected at their lower ends, a pad bridging the upper ends of said sides, a bracket secured upon said pad, a hinge having an intermediate hinge pin secured through the said bracket and outstanding leaves provided with slotted openings, and connecting members carried by the upper ends of the sides and having inturned pockets in which said hinge leaves are adjustably secured.

7. A metallic horse collar comprising tubular sides adjustably and detachably connected at their lower ends, telescoping extensions adjustably secured within the upper ends of said sides and provided with outer angular ends inturned toward one another, a pad bridging the upper ends of the said sides, a hook supporting bracket rigidly secured to, and upstanding from, the pad, a hinge including a pin secured through the said bracket, and outstanding leaves projecting into the said inturned ends of said side extensions and provided with slotted openings, and connecting bolts carried by the said inturned ends of the said side extensions and projecting through said slotted openings of said hinge leaves, for the purpose described.

ALEXANDER THOMSON.

Copies of this patent may be obtained for five cents each, by addressing the "Commissioner of Patents, Washington, D. C."